(12) United States Patent
Wang et al.

(10) Patent No.: US 7,675,901 B2
(45) Date of Patent: Mar. 9, 2010

(54) METHOD AND AN APPARATUS FOR MAPPING AN MPEG TRANSPORT STREAM INTO IP PACKETS FOR WLAN BROADCAST

(75) Inventors: Charles Chuanming Wang, Jamison, PA (US); Kumar Ramaswamy, Princeton, NJ (US); Guillaume Bichot, La Chapelle Chaussee (FR); Junbiao Zhang, Bridgewater, NJ (US)

(73) Assignee: Thomson Licensing, Issy les Moulineau (FR)

( * ) Notice: Subject to any disclaimer, the term of this patent is extended or adjusted under 35 U.S.C. 154(b) by 750 days.

(21) Appl. No.: 10/541,930

(22) PCT Filed: Jan. 9, 2004

(86) PCT No.: PCT/US2004/000511

§ 371 (c)(1),
(2), (4) Date: Jul. 11, 2005

(87) PCT Pub. No.: WO2004/064300

PCT Pub. Date: Jul. 29, 2004

(65) Prior Publication Data

US 2006/0062200 A1  Mar. 23, 2006

Related U.S. Application Data

(60) Provisional application No. 60/439,093, filed on Jan. 9, 2003.

(51) Int. Cl.
*H04L 12/66* (2006.01)

(52) U.S. Cl. ..................................... 370/352; 455/414.1

(58) Field of Classification Search .................. 370/348, 370/431, 349, 352
See application file for complete search history.

(56) References Cited

U.S. PATENT DOCUMENTS 5,856,973 A * 1/1999 Thompson ................... 370/389
6,172,988 B1 1/2001 Tiernan et al.
6,535,530 B1 * 3/2003 Matsui ........................ 370/536
6,590,902 B1 7/2003 Suzuki et al.
6,781,601 B2 * 8/2004 Cheung ....................... 345/629

(Continued)

FOREIGN PATENT DOCUMENTS

| EP | 0901261 A | 3/1999 |
|---|---|---|
| EP | 0917355 A | 5/1999 |
| EP | 1217838 | 6/2002 |
| EP | 1210825 B1 | 11/2004 |
| JP | 08032956 A | 2/1996 |

(Continued)

OTHER PUBLICATIONS

Search Report Dated August 31, 2004.

(Continued)

*Primary Examiner*—Creighton Smith
(74) *Attorney, Agent, or Firm*—Robert D. Shedd; Joseph J. Opalach; Catherine A. Cooper

(57) ABSTRACT

A method for mapping from an MPEG-2 transport stream to an IP-based RTP/UDP/IP stack for broadcasting service in a WLAN. All the mapping functions may be performed in a receiver transcoder (FIG. 2). Mobile devices such as laptop computers, cell phones and PDAs have limited battery power, CPU processing and memory resources. To reduce CPU processing power and consumption battery power in these devices certain data processing functions are achieved in the communicating systems, such as the de-multiplexer function that typically prepares an MPEG-2 for retransmission at the local level. When a transcoder, capable of de-multiplexing and MPEG-2 transport stream receives a program it de-multiplexes the stream based on PIDs assigned to each transport packet. This de-multiplexing function extracts several components from a transport stream: video and audio PES/ES associated with programs and PSI (PAT and PMTs).

4 Claims, 3 Drawing Sheets

U.S. PATENT DOCUMENTS

| | | |
|---|---|---|
| 2002/0003799 A1 | 1/2002 | Tomita |
| 2002/0068584 A1* | 6/2002 | Gage et al. ................. 455/456 |
| 2002/0085585 A1* | 7/2002 | Tzeng ........................ 370/475 |
| 2002/0194606 A1* | 12/2002 | Tucker et al. ................ 725/86 |
| 2003/0118322 A1 | 6/2003 | Kim |
| 2004/0001457 A1* | 1/2004 | Chitrapu ..................... 370/328 |
| 2004/0052275 A1* | 3/2004 | Murakami et al. .......... 370/503 |
| 2004/0131060 A1* | 7/2004 | Newberg et al. ............ 370/390 |

FOREIGN PATENT DOCUMENTS

| | | |
|---|---|---|
| JP | 11308612 A | 11/1999 |
| JP | 11346200 A | 12/1999 |
| JP | 2001-189752 A | 7/2001 |
| JP | 2002-118841 A | 4/2002 |
| JP | 2002-262264 A | 9/2002 |
| JP | 2003-519992 A | 6/2003 |
| RU | 2073913 C1 | 2/1997 |
| WO | WO9720413 | 6/1997 |
| WO | WO9746007 | 12/1997 |
| WO | WO0064119 | 10/2000 |
| WO | WO0155860 | 8/2001 |
| WO | 0180547 A | 10/2001 |

OTHER PUBLICATIONS

"Information Technology—Generic coding of moving pictures and associated audio information: Systems; H.222.0 (Feb. 2000)" ITU-T standard in force (I), International Telecommunication Union, Geneva CH Feb. 1, 2000, XP017401300.

Don Hoffman et al., "RTP Payload Format for MPEG1/MPEG2 Video: draft-ietf-avt-mpeg-01.txt" IETF Standard-Working-Draft, Internet Engineering Task Force, IETF, CH, vol. avt, No. 1, Nov. 1, 1995. XP015015615.

Audio-Video Transport Working Group H Schulzrinne GMD Fokus S Casner Precept Software et al., "RTP: A Transport Protocol for Real-Time Applications; rfc1889.txt" IETF Standard, Internet Engineering Task Force, IETF, CH Jan. 1, 1996, XP015007673 ISSN: 0000-0003.

Ng Yew Meng et al., Adaptive video distribution using IP multicast Networks, 2000. (ICON 2000). Proceedings. IEEE International Conference on Sep. 5-8, 2000, Piscataway, NJ USA, IEEE, Sep. 5, 2000, pp. 494-494, XP01514156.

* cited by examiner

METHOD AND AN APPARATUS FOR MAPPING AN MPEG TRANSPORT STREAM INTO IP PACKETS FOR WLAN BROADCAST

This application claims the benefit, under 35 U.S.C. § 365 of International Application PCT/US04/00511, filed Jan. 9, 2004, which was published in accordance with PCT Article 21(2) on Jul. 29, 2004 in English and which claims the benefit of U.S. provisional patent application No. 60/439,093, filed Jan. 9, 2003.

FIELD OF THE INVENTION

This invention generally relates to a method and an apparatus for broadcasting audio and video programs to a wireless local area network enabled device.

DESCRIPTION OF RELATED ART

The present invention is in the context of WLAN specifications defining conventional local area network access points, which provide radio communication to mobile devices and other networks, such as hard wired local area networks and global networks, such as the Internet. Wireless receiving points utilized in conditional access broadcasting may include a set top box in a simple system, whereas in commercial rebroadcast systems a transcoder/multiplexer/demultiplexer (TMD) may operate in conjunction with a local video server.

FIG. 1 illustrates an exemplary digital video and audio system suitable for implementing the present invention. At the head end a multiple video and audio content stream is converted into a digital format (typically in accordance with the MPEG-2 standard) and transmitted via satellite to a receiving dish, or other suitable means, which is attached to a receiver referred to as a set top box or other suitable means such as a TMD. U.S. Pat. No. 6,510,519, describes a representative system utilizing a head end and a set top box including tuners, de-modulators, decoders, transport de-multiplexers, microprocessors, program memories, video picture memories, MPEG video decoders, displays, and smart cards. Most digital broadcast system data streams are encoded and scrambled for security purposes at a transmitter; once decryption and decoding occur at a receiver, the system builds a video composite picture in memory and displays the desired picture synchronized with its audio component on a monitor. In addition to descrambling the program, generally, further authorizations are provided to insure that the particular receiver has been enabled to receive a program or a set of programs.

As further illustrated in FIG. 1, the TMD 123 operating in conjunction with a local video server may be designed and configured to further communicate with a video LAN and a wireless access point (AP) 145, which in the illustrative example provides down line receivers with demultiplexed video and audio transmission streams including synchronized signals necessary for the transmission of the video and audio content.

WLAN technology deployed in a "hot spot" (e.g. hotel lobby, airport, shopping mall, café, etc), provides live wireless TV broadcasting to WLAN-enabled mobile devices that attract many network service providers. Currently, in those high-volume traffic hot spots, a TV set tunes to a pre-set channel (e.g. CNN, FOX or CBS) and viewers have no choice in selecting a different channel. Utilizing the methods of the present invention, WLAN deployment and WLAN-enabled devices, can receive TV programs, wherein a viewer may choose among available broadcast TV programs.

Currently, TV broadcasting studios broadcast programs in digitally compressed MPEG-2 streams. Those streams are packetized into MPEG-2 Transport Streams (TS) for distribution over a constant-delay network, such as satellite and cable networks. When the streams are received at hot spots they are re-broadcasted over an IP based WLANs, necessitating a mapping from the transport stream to IP packets so as to be compatible with the WLAN protocols.

An MPEG 2 transport stream is comprised of a set of multiplexed compressed audio/visual programs as well as related program information. Such MPEG2 transport streams are broadcast in satellite, terrestrial, and cable networks. The receiver (e.g. a set top box or TMD) receives the entire transport stream (several programs), and proceeds to demultiplex and decode the transport stream, ultimately producing a specific audio/visual program according to the user's choice.

A method for broadcasting an MPEG2 TS in an Ethernet local area network is to carry the MPEG2 TS packets over the Universal Datagram Protocol (UDP) and IP multicast/broadcast protocols (e.g. protocols utilized by a multicast group such as: dedicated IP multicasting IP address and Internet Group Management Protocol (IGMP)). These techniques require a significant amount of processing power to demultiplex the MPEG2 TS in the receiving terminal. In the context of WLAN where the terminal is a mobile device, such as a PDA or cellular phone, power consumption and CPU processing power are critical resources needing conservation.

Mapping MPEG-2 TS packets into IP packets for video broadcasting service requires special consideration of the characteristics of the TS. MPEG-2 TS protocol was designed to carry digitally compressed video and audio streams over a Constant Delay Network, such as a cable or a satellite network. In addition to the audio and video contents in a transport stream format, information about the underlying programs is carried in the same transport stream to assist the receiver in selecting a desired program. Such information is called Program Specific Information (PSI), which includes a Program Association Table (PAT), a Conditional Access Table (CAT), and a plurality of Program Map Tables (PMT), identified by associated Packet Identifiers (PID).

When mapping from MPEG-2 TS packets into IP packets for broadcasting services in an IP network, the receiver must take special care with the extra information linked to a particular program. The result of data mapping must be designed for communication over a well-known IP address and port, such that every host in an associated sub network receive the data without pre-configuration. Mapped data must be transmitted at certain minimum interval so that a receiver can rapidly capture the program information and tune to a program without undue delay. Mapped data must be transmitted using as narrow a channel bandwidth as possible to conserve the bandwidth within the allocated spectrum. The last two requirements comprise mutually opposed objectives. A design trade-off must balance these opposing goals systematically. In an IP based network, Real Time Protocol (RTP) over UDP/IP is used to encapsulate video or audio packets. This RTP/UDP/IP protocol stack has many features embedded in the protocol headers similar to the features in an MPEG-2 TS. A well designed mapping must compare MPEG-2 TS with the RTP/UDP/IP stack to ascertain the mapping that achieves: (1) a WLAN with limited channel capacity where a reduced overhead and minimum bandwidth is essential; and (2) simplifying the processing of an incoming video/audio stream for PDA and cellular phone devices so as to be able receive a broadcasting application in real-time.

A WLAN broadcasting system may transmit and process multiple television programs carried in an MPEG-2 TS and re-broadcast the programs to WLAN-enabled devices within a WLAN coverage area. From a satellite transponder, a receiver receives an MPEG-2 transport stream consisting of fixed-sized transport packets. As suggested in D. Hoffman et al., "RTP Payload Format for MPEG1/MPEG2 Video," IETF RFC 2250, January 1998, those transport packets can be directly encapsulated into an RTP payload and carried over an IP-based WLAN. This approach has the following drawbacks: It relies on the receivers to process (de-multiplex) the transport stream. For mobile terminals, the CPU power is limited and should be dedicated to other essential tasks, such as video and audio decoding and displaying. Furthermore, all the transport packets are carried over in RTP payload, whether the receivers require them or not, wasting bandwidth resources.

SUMMARY OF THE INVENTION

In the present invention, a novel mapping from an MPEG-2 TS to IP-based RTP/UDP/IP stack for broadcasting service in a WLAN permits all mapping functions to be performed in a receiver such as a TMD. The invention provides an apparatus and a method for mapping an MPEG-2 transport stream into IP protocols to serve IP based MPEG-2 broadcasting services for efficient distribution over an IP network such as a WLAN, of programs contained within a transport stream, to a final destination for video and audio presentation. The invention performs a preprocessing with the transport stream, including demultiplexing and mapping of MPEG-2 formatted data prior to distribution over the wireless network, enabling each intended wireless receiver to determine a specific program and thereby process only the packets associated with a specific program, rather than receive and process every program available in the transport stream. The invention has the benefit of reducing the bandwidth required to transmit the entire MPEG-2 transport stream. Furthermore, demultiplexing within the network allows re-coding of the MPEG-2 program streams at desired bit transmission rates.

The invention disclosed herein includes a means for receiving a transmission stream having data formatted into distinct packets that includes at least one PID and associated PSI (mainly PAT, PMT and CAT data); a means for demultiplexing the PSI based upon the associated PID assignments to unique transport packets; a means for reassembling the PSI in accordance with a RTP data flow; a means for encapsulating the RTP data stream into IP packets with a multicast address; and a means for communicating a reassembled transport stream over a WLAN. As such the invention may be embodied in any media server (referred to generally as a transcoder) capable of satisfying the means associated with the invention. Such media servers may include devices such as TMDs, set top boxes, and wireless access points as defined under the IEEE 802.11 standard.

The invention further discloses a means for communicating that comprises a video WLAN, and the means for reassembling the PSI including a means for inserting a multicasting IP address for each associated PMT. Once the PMT has had the multicasting IP address inserted the invention includes calculating a corresponding cyclical redundancy check or CRC. In one embodiment, the PSI is formed from the PAT and the PMT whereby the PSI contains a descriptor field, in which the multicasting IP address is stored. The PSI also contains a feature referred to as a null flag to indicate that the state of the PSI remains unchanged from the prior transmission. In the event that the PSI had changed from the prior transmission the state of the flag is changed to indicate that the PSI state has changed.

In accordance with the present invention, any mobile device that receives a transmission stream from a video LAN includes the ability to receive at least one reassembled PID and associated PSI; a means for demultiplexing the reassembled PSI based upon PID assignments to transport packets in accordance with a RTP data flow; and a means for extracting the inserted multicast address; and a means for receiving a transmission stream associated with the inserted multicast address. Such receivers may include any device capable of providing the means for carrying out the present invention, including television receivers, wireless access devices (as for example, specified but not limited to IEEE 802.11 standards, or the Hiperlan 2 standard), PDAs and other forms of computer technology.

An embodiment of the invention disclosed herein includes a method for mapping MPEG-2 into an IP-based RTP/UDP/IP stack comprising the steps of: receiving a transmission stream having data formatted into distinct packets that includes at least one PID and associated PSI; demultiplexing the PSI based upon PID assignments to unique transport packets; and reassembling the PSI in accordance with a RTP data flow; encapsulating the RTP into a multicast address; and calculating a corresponding CRC.

When the new PSI has been assembled in accordance with the RTP data flow and the RTP has been encapsulated into a multicast address, the new transport stream is transmitted over a WLAN.

The invention disclosed herein includes a method of receiving at a mobile station the MPEG-2 TS in an IP-based RTP/UDP/IP stack comprising the steps of: receiving a transmission stream having data formatted into distinct packets that includes at least one PID and associated PSI; a means for demultiplexing the PSI based upon PID assignments to unique transport packets in accordance with the RTP data flow; a means for extracting a multicast address; a means for receiving a transmission stream associated with the multicast address.

An embodiment of the present invention also includes a computer readable medium for mapping an MPEG-2 formatted transport stream into an IP-based RTP/UDP/IP stack having stored thereon one or more data structures selected from the group comprising of distinct packets that includes at least one distinct packet that includes at least one first field containing an IP multicast address, a second field representing the PAT and associated PMT (1); a third field containing the RTP head and a fourth field a containing a program.

BRIEF DESCRIPTION OF THE DRAWINGS

The invention is described with the following detailed description with the accompanying drawings.

DETAILED DESCRIPTION OF THE INVENTION

In the figures to be discussed the circuits and associated blocks and arrows represent functions of the process according to the present invention which may be implemented as electrical circuits, and associated wires or data busses, which transport electrical signals, and/or software modules. Alternatively, one or more associated arrows may represent communication (e.g., data flow) between software routines, particularly when the present method or apparatus of the present invention is implemented as a digital process.

Figure 1:
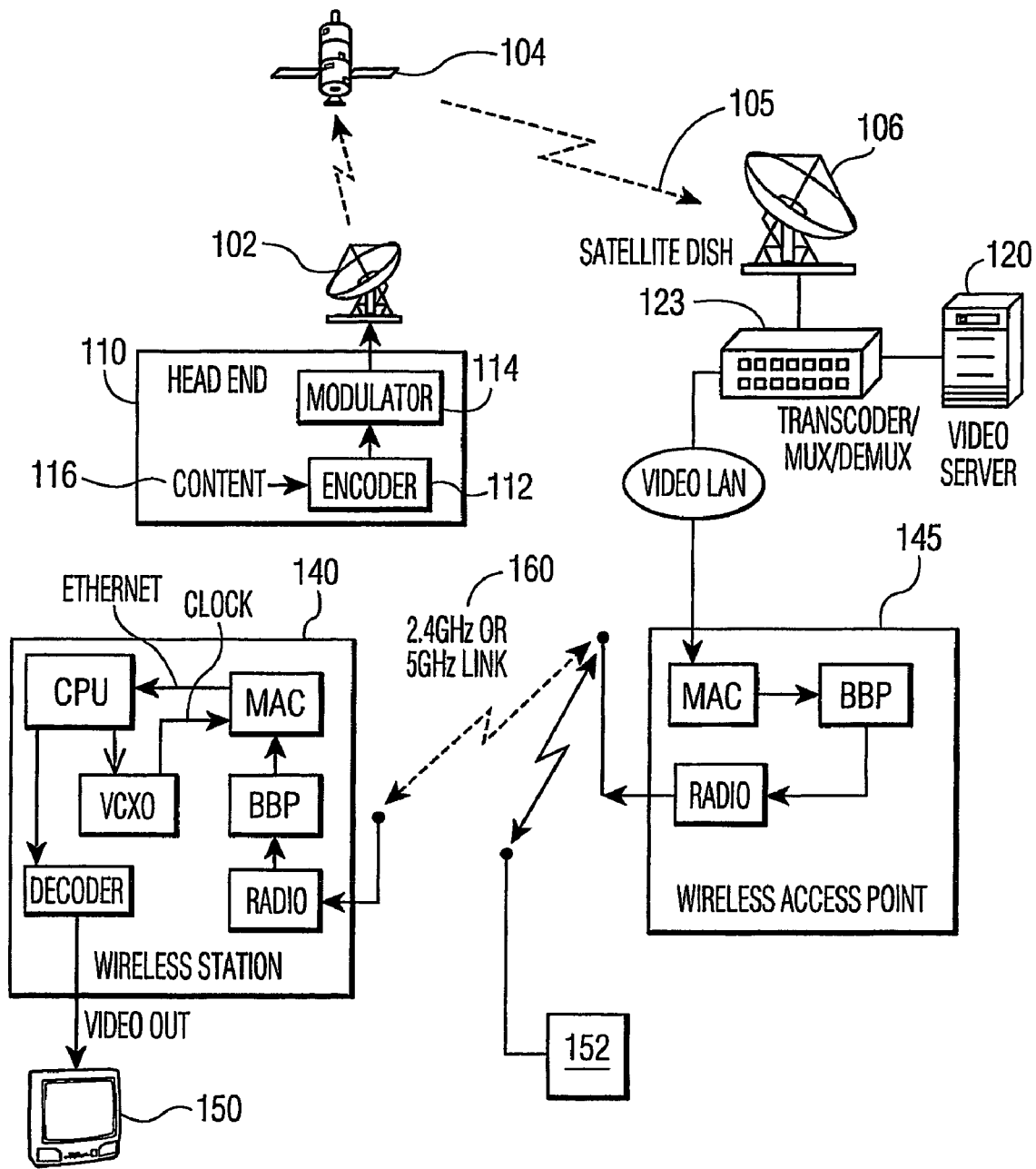
FIG. 1 is a block diagram of a WLAN video broadcasting system.

The prior art in FIG. 1 illustrates in overview a digital broadcast system 100 that supplies audio visual programming. All digital broadcast system data streams contain video, audio, timing information which are encoded or scrambled for security purposes, that is to insure only authorized subscribers can view the programs transmitted.

In a digital broadcast system, the customer receives, in addition to the video and audio information, various administrative and control messages such as entitlement control messages, which contain an exploitation key necessary to decrypt the encrypted control word necessary to decode a descrambling key so as to permit the decryption and assembling of the digital video and audio data. Once decryption occurs, the system builds a video composite picture in memory, typically in accordance with the MPEG-2 standard, and displays the desired picture on a display.

In accordance with FIG. 1, a Head End 110 digitally formats video and audio content 116, utilizing a subsystem 113 that includes an encoder, packetizer and multiplexer, which is then modulated with modulator 114, so as to be transmitted from a transmitter 102 via satellite 104 to a receiving dish 106 located at a receiving end for television service to conditional access customers.

The receiving end typically is a TMD 123 operating in conjunction with a local video server 120, which electronically connects to the receiving dish 106. The TMD 123 contains a demodulator (not shown) that demodulates the received signal and outputs the demodulated signal to a central processing unit (not shown) that processes the many packetized streams by routing select packets to various control, data and status subsystems. For example, typically the selected packetized video and audio stream is sent to a transcoder (not shown) for translation into a format suitable for output to a wireless station 140, which serves as the receiving device for devices such as a television 150 operating in accordance with NTSC, PAL or SECAM formats, or laptop computer, cell phone or personal digital assistance (PDA) all in accordance with IEEE 802.11, or other applicable wireless networking standards. A wireless receiver device may be representative of wireless station 140, which, may in turn, depict a mobile device such as a laptop computer, or a cell phone or PDA device. Therefore, stations may be mobile, portable, or stationary and all stations that are IEEE 802.11 compliant provide for services of authentication, de-authentication, privacy, and data delivery. Other WLAN devices, such as HiperLan 2 may be used for the purposes of wireless transmission.

Figure 2A:
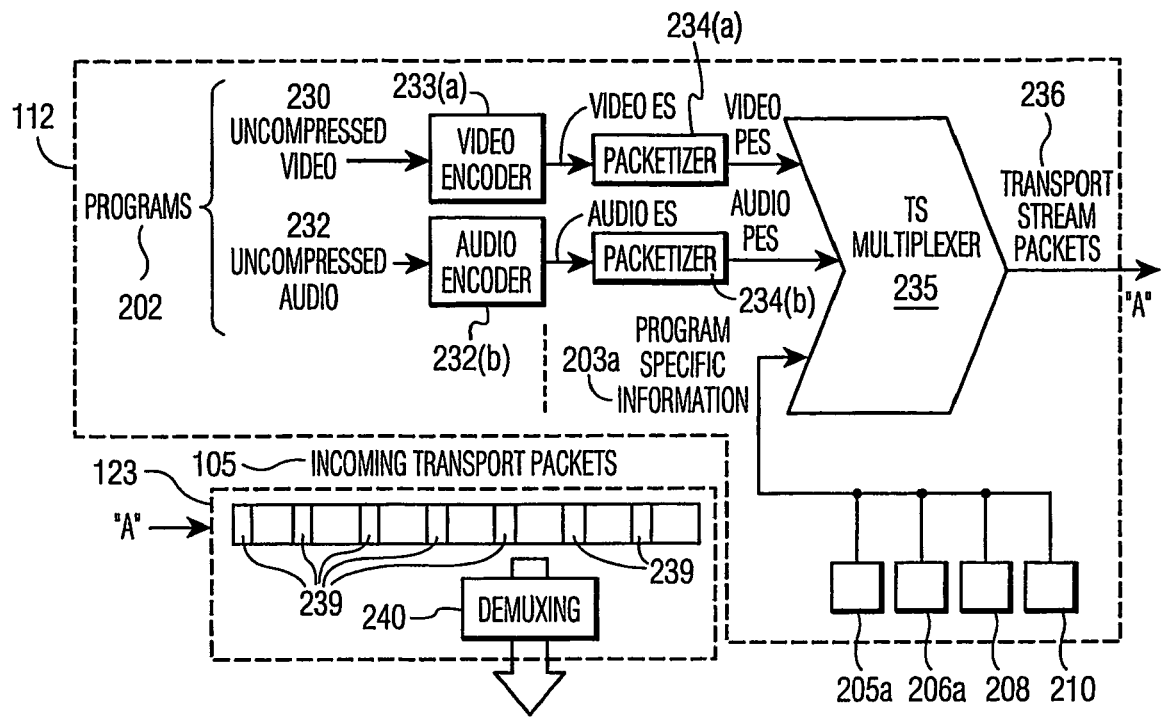
FIG. 2 is a block diagram of the invention for distributive processing of the program content in a transport stream.
Figure 2B:
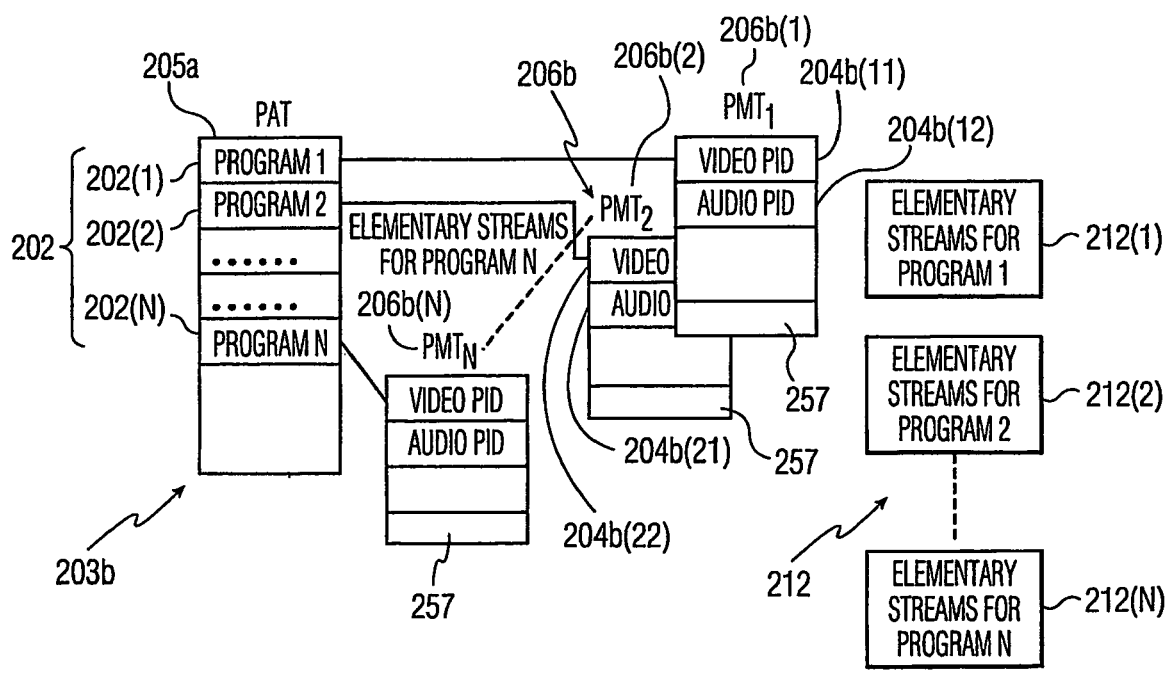
Figure 2C:
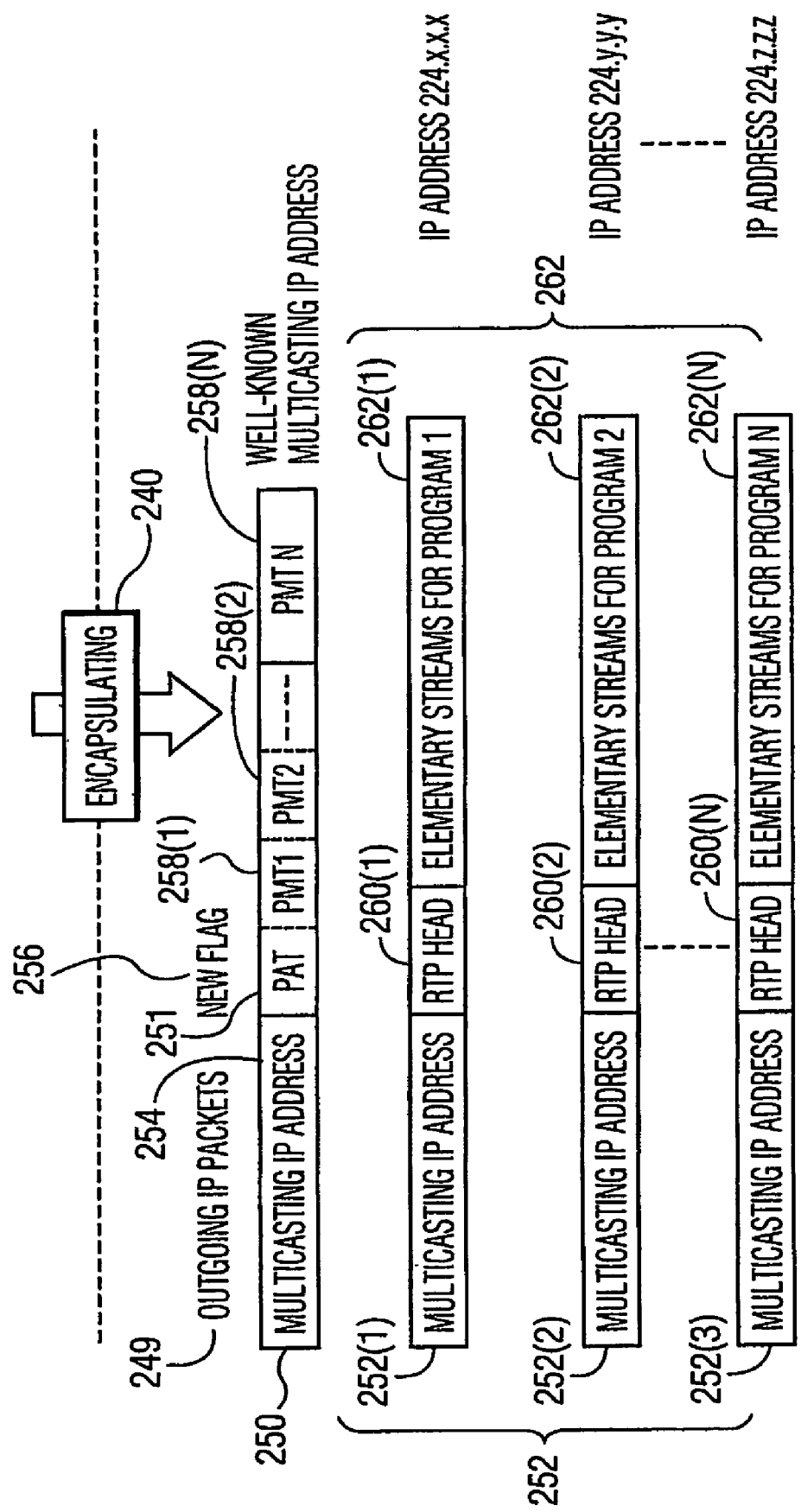

With reference to FIG. 1 and FIG. 2, the process of generating an MPEG-2 TS from uncompressed video and audio begins with a plurality of programs 202 in the head end 110. Each of the programs 202 consists of at least one uncompressed elementary video signal 230 and one uncompressed elementary audio signal 232. Multiple video (e.g. for different viewing perspectives) and audio (e.g. for different languages) elementary streams in a program 212 is permissible within the current commercial broadcast conventions. Each of the digitized audio and video signals of a program 202 are processed by the encoders consisting of a video encoder 233(a) and an audio encoder 232(b); packetized 234(a), 234(b) and multiplexed 235 so as to incorporate associated Program Specific Information (PSI) 203a, including Program Association Table (PAT) 205a, Program Map Table (PMT) 206a, Network Information Table (NIT) 208 and Conditional Access Table (CAT) 210. The multiplexed 235 transport stream packets 236 includes specific program information among the plurality of programs 202. Each transport packet belongs to a particular elementary stream (either a video, audio or PSI 203a).

The assembled transport stream packets 236 as produced by subsystem 113 are modulated with the appropriate carrier signals by modulator 114 for transmission and broadcast in the MPEG-2 TS format. Those skilled in the art of broadcast communications will recognize that alternatively the transport stream packets 236 may be broadcast via a local multimedia server and associated transmission lines (unshown).

The TMD 123 receives the transport packet 105 (FIG. 2A) in the MPEG-2 TS format, which contains PSI 203a information such as the different tables that provide information about the programs 202 transported in the transport stream packets 236. Referring to FIG. 2A, demultiplexing process 240 disassembles and reassembles in a hierarchical relationship a PAT 205a several PMTs 206b (FIG. 2B) corresponding to the PMT 206a and the programs 202 that the transport stream 236 carries. A PAT is always identified by PID=0. In the PAT 205a, all the programs such as program 202 (1), 202 (2) through 202 (n) are listed. Furthermore, each program is associated with a specific PMT 206b, is associated with the program 202 in the PAT 205a.

Not all the programs 202 received from the head end 110 are to be rebroadcast in a WLAN broadcasting service. Therefore, undesired elementary streams are discarded in the processing reducing the processing time and the WLAN bandwidth. If Encryption/Reencryption of content is not required in the broadcasting, the CAT 210 in an MPEG-2 TS may be ignored in the implementation of the present invention.

Having reassembled in the demultiplexer 240 (FIG. 2A) a hierarchical relationship (PSI) 203b, which includes the (PAT) 205a, (PMT) 206a, (NIT) 208 and all the elementary streams 212 for WLAN broadcasting service, the TMP 123 maps each broadcasting elementary stream 212 of a program 202b into a RTP traffic data flow. The RTP packets 249 are encapsulated in multicasting addresses such as, by way of illustration, multicasting IP addresses 250, 252. Those skilled in the art of Internet communications will recognize these as Class D IP addresses. The multicasting addresses 250, 252 are used to transmit elementary streams as announced by the packets 249 over a WLAN 160.

When MPEG-2 video and audio elementary streams 260 of a program 202 are carried in a RTP payload such as packets 249, video and audio may be encapsulated into separate RTP traffic flows with distinct RTP payload types. This encapsulation of separating video and audio requires that a receiver synchronize video and audio for lip synchronization. Another encapsulation proposes a bundled video and audio elementary streams belonging to the same program into a single RTP traffic flow for multicasting. This bundled encapsulation provides coherent synchronization between video and audio. This bundled encapsulation of video and audio in a single RTP traffic flow is preferred.

To ensure that all the hosts connecting to the wireless broadcast access point 145 receive the PSI 203a for program selection, the PSI 203a must be sent with the audiovisual streams to aid users in choosing broadcasting programs. There are two approaches that achieve this objective.

The first approach directly maps PSI 203b tables derived from PSI 203a in their original formats into a well-known multicast address 250. Due to the different addressing schemes used in MPEG-2 TS and the IP network, the transcoder 123 must insert the multicasting IP address 250, 252, for each program in its associated PMT 206b.

When a multicasting IP address 250, 252 is inserted into the PMT 206b, additional byte space is required to store the multicasting IP address 250, 252. The descriptor field 253 in the PMT 206 can be used to store and carry the multicasting IP address 250,252. After inserting the multicasting IP address in the PMT 206b, the CRC 257 for the PMT 206b must be re-calculated due to the modification of the PMT 206b. The PAT 205a and the PMT 206b information are processed to form the new program specific information PSI packets 254 carried in a UDP/IP format using a well-known multicast address 250.

The second approach is to define new PSI protocol suitable for a WLAN based video broadcasting service. The PSI protocol is carried over the same well-known multicast address 250 and delivered to all the hosts within WLAN 160 coverage area. The second approach provides a means to support proprietary data in the PSI 203b. In either approach, the packets carrying the PSI 203b are referred to as PSI packets to distinguish them from the packets carrying the elementary streams 262.

To reduce the receiver processing time, when such program information remains unchanged during sequestial transmission of TS, (no changes in PAT and PMTs), a reserved bit 256 in a PSI packet 251, may be borrowed as a new flag 256, which according to its state indicates that the PSI and others remain the same or has changed since the immediately prior transmission. If any changes have occurred since the last transmission, the new flag 256 is set. Otherwise, the new flag 256 state remains unset.

A mobile device 140 first processes the PSI packets 251, 258 encapsulated in the well-known broadcast address 250, 252 to restore the program specific information stream in order to compose a program map, including the list of elementary streams 262 for each program 202 and their corresponding multicast addresses 250, 252. The mobile device 140 may ignore the subsequent PSI packets 251, 258 as long as the new flag 256 remains unset. The program map must be re-built in a client once the new flag 256 changes state in a received PSI packet 251. When a user requests to view a program 202, the mobile device 140 extracts the multicasting IP address 250,252 from the program map and then only responds to the IP packets 249 associated with that multicasting IP address 250,252. When a user switches to a different program 202 (such as when a user changes viewing channel on a television, the mobile device 140 first locates the associated program information from the program map, extracts the multicasting addresses 250,252 associated with the program 202 and responds to the packets 249 destined to the selected multicasting addresses 250,252. In this manner mobile device 140 selects various programs 202. Those skilled in the art will understand that the implementation of the foregoing process maybe implemented in either software or hardware.

In mapping video and audio TS packets, transport packet headers are eliminated during the mapping due to the redundant fields in both TS header 239 and RTP header 260. In the TS header, the relevant field for a broadcast is a continuity counter and Program Clock Reference (PCR). A PCR is inserted in an adaptation field of a TS header 239 wherein the adaptation field is optional. The continuity counter is used for a receiver to detect any packet loss. However, a field called sequence number is specified in the RTP header 260, which plays a similar role. The PCR is used to precisely synchronize the clocks of receiver and transmitter in a constant delayed network. This clock synchronization may be simplified in other means such as a timestamp in the RTP header 260.

In the MPEG-2 transport stream 236, elementary streams are usually encapsulated in a packetized elementary stream (PES). The PES header carries various rate, timing, and data descriptive information, as set by the source encoder. One option is to map an entire PES packet directly to a RTP packet to reserve all the information carried in a PES header. However, most of the fields in a PES header are optional. The most relevant field in a PES header to a broadcasting service is the Presentation Time Stamp (PTS). This PTS of MPEG-2 picture or audio frame can be carried in the timestamp field in the RTP header 260. The RTP packets 252 carry the picture or audio frame packets from the same program and should have the same timestamp.

To reduce the overhead of RTP/UDP/IP headers (total 40 bytes), a standard compression scheme may be applied. This compression algorithm compresses the combined RTP/UDP/IP 40 byte header to a 2 byte when UDP checksum is not sent, and 4 bytes otherwise.

An embodiment of the present invention includes a method for mapping MPEG-2 TS into an IP-based RTP/UDP/IP stack 252 comprising the steps of receiving a transmission stream 236 having data formatted into distinct packets that includes at least one PID 206a and associated PSI; and demultiplexing the PSI based upon PID 206a assignments to unique transport packets in accordance with a RTP data flow; and extracting a multicast address; and assembling a video program associated with the multicast address.

In referring to FIG. 2 an embodiment of the invention includes a computer readable medium 250, 252 for mapping an MPEG-2 formatted transport stream packet 236 into an IP-based RTP/UDP/IP stack 252 having stored thereon one or more data structures selected from the group comprising of distinct packets that includes at least one distinct packet that includes at least one first field containing an IP multicast address 250, a second field representing the PAT 251 and at least one associated PMT such as PMT 258 (1); a third field such as 260 (1) a containing data representing the RTP head 260 (1) and a fourth field 262a containing data representing a program such as 262 (1).

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed is:

1. A device for wirelessly transmitting and receiving audio and video data, comprising:
   means for receiving a transmission stream having data formatted into distinct packets that includes at least one packet identifier and an associated program specific information, including a program association table, a program map table, a conditional access table and a network information table;
   means for demultiplexing the program specific information based upon one or more packet identifier assignments to unique transport packets;
   means for eliminating transport stream packet headers;
   means for reassembling the program specific information in accordance with a real time protocol data flow;
   means for encapsulating the real time protocol data flow into one or more internet protocol packets with corresponding multicast addresses; and
   means for communicating the reassembled transport stream, wherein the program specific information contains a flag to indicate that the program specific information is unchanged from a prior transmission.

2. A device for wirelessly transmitting and receiving audio and video data, comprising:
   means for receiving a transmission stream having data formatted into distinct packets that includes at least one packet identifier and an associated program specific information, including a program association table, a program map table, a conditional access table and a network information table;
   means for demultiplexing the program specific information based upon one or more packet identifier assignments to unique transport packets;
   means for eliminating transport stream packet headers;
   means for reassembling the program specific information in accordance with a real time protocol data flow;
   means for encapsulating the real time protocol data flow into one or more internet protocol packets with corresponding multicast addresses; and
   means for communicating the reassembled transport stream
   wherein the program specific information contains a flag to indicate that the program specific information is changed from a prior transmission.

3. A device for wirelessly transmitting and receiving audio and video data, comprising:
   means for receiving a transmission stream having data formatted into distinct packets that includes at least one packet identifier and an associated program specific information, including a program association table, a program map table, a conditional access table and a network information table;
   means for demultiplexing the program specific information based upon one or more packet identifier assignments to unique transport packets;
   means for eliminating transport stream packet headers;
   means for reassembling the program specific information in accordance with a real time protocol data flow;
   means for encapsulating the real time protocol data flow into one or more internet protocol packets with corresponding multicast addresses;
   means for communicating the reassembled transport stream; and
   means for storing said audio and video data, wherein said audio and video data are stored on a computer readable medium in one or more data structures selected from the group comprising one distinct packet that includes at least one first field containing an internet protocol multicast address, a second field representing a program association table and an associated program map table, a third field containing data representing a real time protocol header and a fourth field containing data representing a program;
   wherein the program specific information further contains a flag to indicate that the program specific information is unchanged from a prior transmission.

4. A device for wirelessly transmitting and receiving audio and video data, comprising:
   means for receiving a transmission stream having data formatted into distinct packets that includes at least one packet identifier and an associated program specific information, including a program association table, a program map table, a conditional access table and a network information table;
   means for demultiplexing the program specific information based upon one or more packet identifier assignments to unique transport packets;
   means for eliminating transport stream packet headers;
   means for reassembling the program specific information in accordance with a real time protocol data flow;
   means for encapsulating the real time protocol data flow into one or more internet protocol packets with corresponding multicast addresses;
   means for communicating the reassembled transport stream; and
   means for storing said audio and video data, wherein said audio and video data are stored on a computer readable medium in one or more data structures selected from the group comprising one distinct packet that includes at least one first field containing an internet protocol multicast address, a second field representing a program association table and an associated program map table, a third field containing data representing a real time protocol header and a fourth field containing data representing a program;
   wherein the program specific information further contains a flag to indicate that the program specific information is changed from a prior transmission.

* * * * *